United States Patent [19]
Lewis

[11] Patent Number: 6,042,923
[45] Date of Patent: Mar. 28, 2000

[54] RAMP ASSEMBLY FOR ALL-TERRAIN VEHICLES

[76] Inventor: Robert P. Lewis, 12 W. 200 North P.O. Box 782, Morgan, Utah 84050

[21] Appl. No.: 08/974,061

[22] Filed: Nov. 19, 1997

[51] Int. Cl.[7] .................................................. B65G 69/28
[52] U.S. Cl. ................................ 428/68; 14/71.1; 296/61; 296/62; 414/537; 414/538; 428/120; 428/906
[58] Field of Search .............................. 428/68, 120, 906; 414/537, 538; 296/61, 62; 14/71.1

[56] References Cited

U.S. PATENT DOCUMENTS

| | | | |
|---|---|---|---|
| 3,711,882 | 1/1973 | Iller | 414/537 |
| 3,977,545 | 8/1976 | Lloyd | 414/537 |
| 4,624,619 | 11/1986 | Uher | 414/537 |

*Primary Examiner*—Nasser Ahmad

[57] ABSTRACT

A new ramp assembly for all-terrain vehicles for allowing for easy loading and unloading of an all-terrain vehicle from a pickup truck. The inventive device includes a housing dimensioned for positioning within a bed of a pickup truck. The housing has an open rear wall. A pair of support ramps are slidably received within the open rear wall of the housing. Each of the support ramps includes an inner segment and an outer segment. An outer end of the inner segment and an inner end of the outer segment have a hinge secured therebetween.

1 Claim, 2 Drawing Sheets

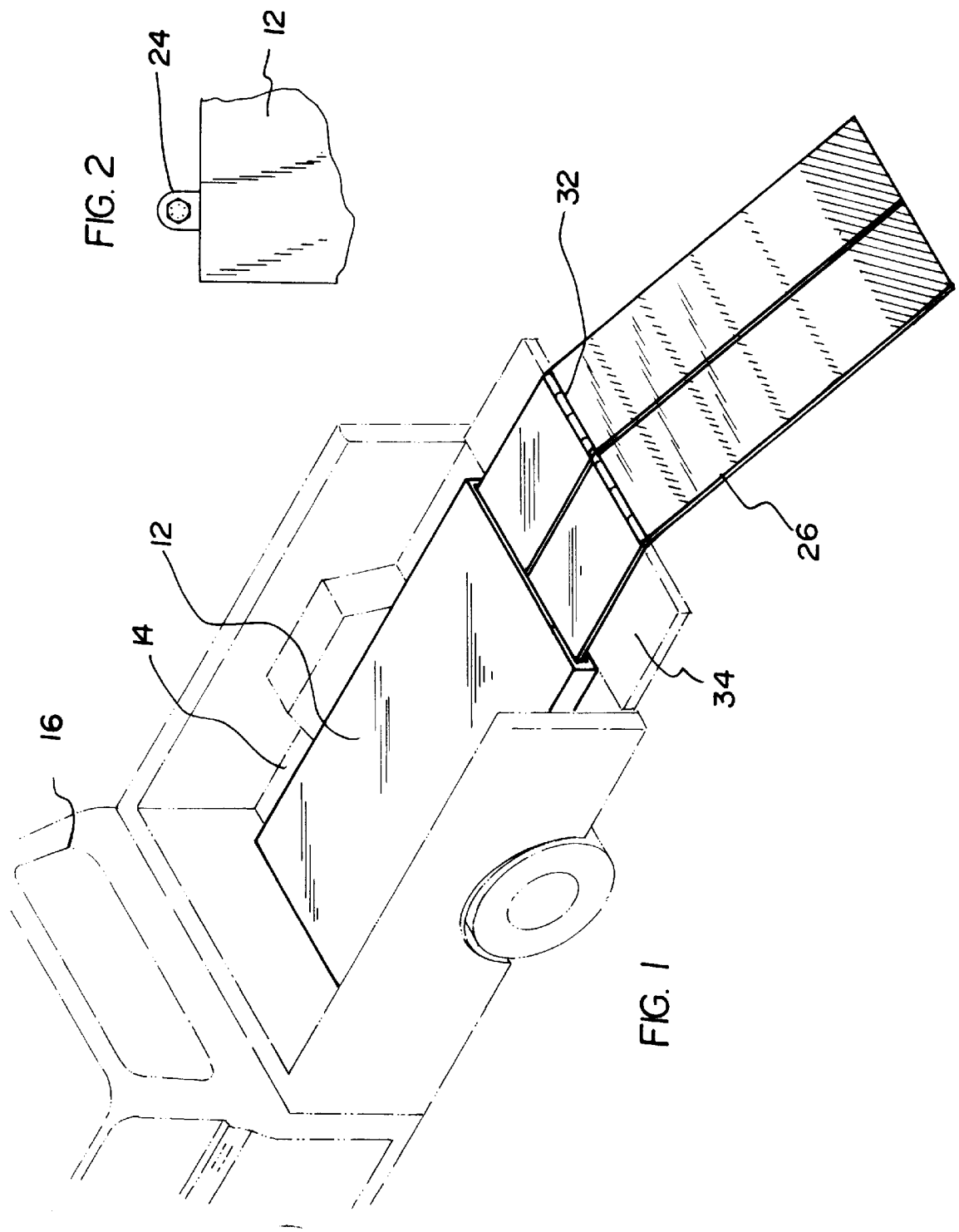

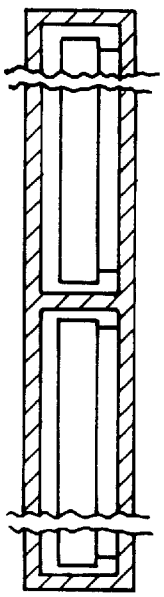
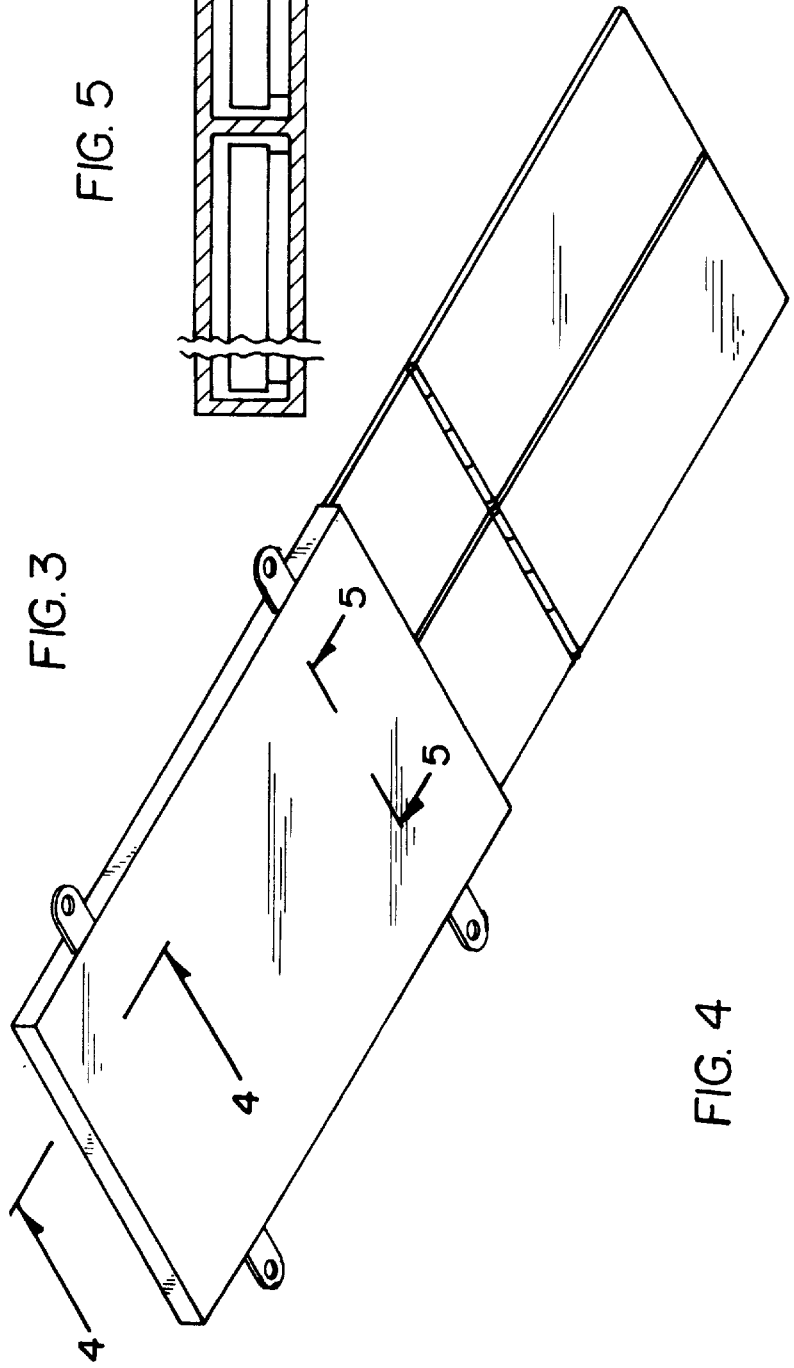
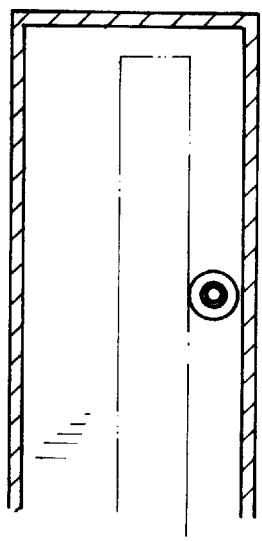

6,042,923

RAMP ASSEMBLY FOR ALL-TERRAIN VEHICLES

BACKGROUND OF THE INVENTION

1. Field of the Invention

The present invention relates to tailgate ramps and more particularly pertains to a new ramp assembly for all-terrain vehicles for allowing for easy loading and unloading of an all-terrain vehicle from a pickup truck.

2. Description of the Prior Art

The use of tailgate ramps is known in the prior art. More specifically, tailgate ramps heretofore devised and utilized are known to consist basically of familiar, expected and obvious structural configurations, notwithstanding the myriad of designs encompassed by the crowded prior art which have been developed for the fulfillment of countless objectives and requirements.

Known prior art tailgate ramps include U.S. Pat. No. 5,244,335 to Johns; U.S. Pat. No. 5,425,564 to Thayer; U.S. Pat. No. 5,133,584 to McCleary; U.S. Pat. No. Des. 360,729 to Collins; U.S. Pat. No. 5,273,335 to Belnap et al.; and U.S. Pat. No. 5,312,149 to Boone.

While these devices fulfill their respective, particular objectives and requirements, the aforementioned patents do not disclose a new ramp assembly for all-terrain vehicles. The inventive device includes a housing dimensioned for positioning within a bed of a pickup truck. The housing has an open rear wall. A pair of support ramps are slidably received within the open rear wall of the housing. Each of the support ramps includes an inner segment and an outer segment. An outer end of the inner segment and an inner end of the outer segment have a hinge secured therebetween.

In these respects, the ramp assembly for all-terrain vehicles according to the present invention substantially departs from the conventional concepts and designs of the prior art, and in so doing provides an apparatus primarily developed for the purpose of allowing for easy loading and unloading of an all-terrain vehicle from a pickup truck.

SUMMARY OF THE INVENTION

In view of the foregoing disadvantages inherent in the known types of tailgate ramps now present in the prior art, the present invention provides a new ramp assembly for all-terrain vehicles construction wherein the same can be utilized for allowing for easy loading and unloading of an all-terrain vehicle from a pickup truck.

The general purpose of the present invention, which will be described subsequently in greater detail, is to provide a new ramp assembly for all-terrain vehicles apparatus and method which has many of the advantages of the tailgate ramps mentioned heretofore and many novel features that result in a new ramp assembly for all-terrain vehicles which is not anticipated, rendered obvious, suggested, or even implied by any of the prior art tailgate ramps, either alone or in any combination thereof.

To attain this, the present invention generally comprises a housing dimensioned for positioning within a bed of a pickup truck. The housing has a generally rectangular configuration. The housing has a planar top wall, a planar bottom wall, a short front wall, opposed long side walls and an open rear wall. A central divider panel extends between interior surfaces of the top and bottom walls thereby dividing a hollow interior of the housing into two chambers. The interior surface of the bottom wall has a plurality of guide rollers positioned along a length thereof within each of the two chambers. The opposed long side walls each have a pair of mounting tabs extending outwardly therefrom inwardly of opposed ends thereof. Each of the mounting tabs has an aperture therethrough. A pair of support ramps are slidably received within the two chambers of the housing over the plurality of guide rollers positioned therein. Each of the support ramps includes an inner segment and an outer segment. An outer end of the inner segment and an inner end of the outer segment have a hinge secured therebetween.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new ramp assembly for all-terrain vehicles apparatus and method which has many of the advantages of the tailgate ramps mentioned heretofore and many novel features that result in a new ramp assembly for all-terrain vehicles which is not anticipated, rendered obvious, suggested, or even implied by any of the prior art tailgate ramps, either alone or in any combination thereof.

It is another object of the present invention to provide a new ramp assembly for all-terrain vehicles which may be easily and efficiently manufactured and marketed.

It is a further object of the present invention to provide a new ramp assembly for all-terrain vehicles which is of a durable and reliable construction.

An even further object of the present invention is to provide a new ramp assembly for all-terrain vehicles which is susceptible of a low cost of manufacture with regard to both materials and labor, and which accordingly is then susceptible of low prices of sale to the consuming public, thereby making such ramp assembly for all-terrain vehicles economically available to the buying public.

Still yet another object of the present invention is to provide a new ramp assembly for all-terrain vehicles which provides in the apparatuses and methods of the prior art some of the advantages thereof, while simultaneously overcoming some of the disadvantages normally associated therewith.

Still another object of the present invention is to provide a new ramp assembly for all-terrain vehicles for allowing for easy loading and unloading of an all-terrain vehicle from a pickup truck.

Yet another object of the present invention is to provide a new ramp assembly for all-terrain vehicles which includes a housing dimensioned for positioning within a bed of a pickup truck. The housing has an open rear wall. A pair of support ramps are slidably received within the open rear wall of the housing. Each of the support ramps includes an inner segment and an outer segment. An outer end of the inner segment and an inner end of the outer segment have a hinge secured therebetween.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new ramp assembly for all-terrain vehicles according to the present invention illustrated in use.

FIG. 2 is a partial view of the present invention illustrating a mounting tab thereof.

FIG. 3 is a perspective view of the present invention illustrated in an extended orientation.

FIG. 4 is a cross-sectional view of the present invention as taken along line 4—4 of FIG. 3.

FIG. 5 is a cross-sectional view of the present invention as taken along line 5—5 of FIG. 3.

DESCRIPTION OF THE PREFERRED EMBODIMENT

With reference now to the drawings, and in particular to FIGS. 1 through 5 thereof, a new ramp assembly for all-terrain vehicles embodying the principles and concepts of the present invention and generally designated by the reference numeral 10 will be described.

As best illustrated in FIGS. 1 through 5, the ramp assembly for all-terrain vehicles 10 comprises a housing 12 dimensioned for positioning within a bed 14 of a pickup truck 16. The housing 12 has a generally rectangular configuration. The housing 12 has a planar top wall, a planar bottom wall, a short front wall, opposed long side walls and an open rear wall. A central divider panel 18 extends between interior surfaces of the top and bottom walls thereby dividing a hollow interior of the housing 12 into two chambers 20. The interior surface of the bottom wall has a plurality of guide rollers 22 positioned along a length thereof within each of the two chambers 20. The opposed long side walls each have a pair of mounting tabs 24 extending outwardly therefrom inwardly of opposed ends thereof. Each of the mounting tabs 24 has an aperture therethrough. The apertures allow for screws to be extended therethrough for securement of the housing 12 within the bed 14 of the pickup truck 16.

A pair of support ramps 26 are slidably received within the two chambers 20 of the housing 12 over the plurality of guide rollers 22 positioned therein. At least one roller is positioned along a length of each of the two chambers (see FIG. 4). The roller has a longitudinal axis oriented transverse to a longitudinal axis of an associated one of the two chambers (see FIGS. 4 and 5). The roller has a unitary long cylindrical member having a smooth outer surface (see FIG. 5) for abutting a central portion of an underside surface of an associated one of the support ramps (see FIG. 4). The roller abuts against a medial portion of the associated support ramp (see FIG. 4) for providing support to the associated support ramp along a transverse axis of the associated support ramp. Each of the support ramps 26 includes an inner segment 28 and an outer segment 30. An outer end of the inner segment 28 and an inner end of the outer segment 30 have a hinge 32 secured therebetween.

The present invention is a permanently installed ramp assembly for the bed 14 of the pickup truck 16 that would make loading and unloading all-terrain vehicles faster and easier. The device 10 would eliminate heavy lifting, improve safety, and provide added convenience for the truck owner. It would also enable heavy equipment such as a motorcycle, lawn tractor, loaded wheelbarrow, or snowmobile to be easily moved in or out of the truck bed 14.

In the storage state, the pair of support ramps 26 would be completely hidden within the housing 12. If an ATV needs loading, the tailgate 34 of the pickup truck 16 could be lowered and the support ramps 26 pulled straight out of the housing 12. A pair of spaced stops adjacent to the open rear of the housing 12 would serve to hold the support ramps 26 in place when pulled out. The inner segments 28 of the support ramps 26 would parallel the tailgate 34 with the hinge 32 positioned at upper end of the tailgate 34. Thus, the outer segments 30 can be tilted downwardly until their outer ends abut a recipient surface to allow the ATV to travel thereon. Once the ATV scales the support ramps 26, it would be driven upon the top wall of the housing 12. The housing 12 is fully adapted to support the weight of the ATV. The outer segments 30 can then be tilted upwardly to a horizontal orientation and pushed inside of the housing 12 so it remains concealed and contained until needed again.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ramp assembly for all-terrain vehicles for facilitating loading and unloading of an all-terrain vehicle from a pickup truck, the ramp assembly comprising:

a housing having a hollow interior, said housing being adapted for positioning between a pair of opposing side walls of a bed of a pickup truck, the housing having a generally rectangular configuration, the housing having a planar top wall, a planar bottom wall, a short front wall, opposed long side walls and an open rear wall;

wherein said housing further includes a central divider panel extending between interior surfaces of the top and bottom walls thereby dividing said hollow interior of the housing into two chambers;

at least one roller positioned along a length of each of said two chambers, said at least one roller having a longitudinal axis oriented transverse to a longitudinal axis of an associated one of said two chambers, the opposed long side walls each having a pair of mounting tabs extending outwardly front the opposed long side walls, each of said mounting tabs being offset from all associated end of a respective one of said opposed long side walls, each of the mounting tabs having an aperture therethrough; and a pair of support ramps, each of said support ramps being slidably received within a respective one of the two chambers of the housing, each of the support ramps including an inner segment and an outer segment;

a hinge coupled between an outer end of the inner segment and an inner end of the outer segment whereby said outer segment is pivotable such that an outer end of the outer segment is adapted to be positionable against a ground surface; and said at least one roller having a unitary long cylindrical member having a smooth outer surface for abutting a central portion of an underside surface of an associated one of said support ramps, said at least one roller abutting against a medial portion of said associated support ramp for providing support to said associated support ramp along a transverse axis of said associated support ramp.

* * * * *